US005798437A

United States Patent [19]

Hancock et al.

[11] Patent Number: 5,798,437

[45] Date of Patent: *Aug. 25, 1998

[54] THERMOPLASTIC BLOCK COPOLYMERS

[75] Inventors: Lawrence Francis Hancock, North Andover, Mass.; Alan Jay Kishbaugh, Columbia, Md.; Marc Ellous Parham, Bedford, Mass.

[73] Assignee: Circe Biomedical, Inc., Lexington, Mass.

[*] Notice: The term of this patent shall not extend beyond the expiration date of Pat. No. 5,700,902.

[21] Appl. No.: 681,946

[22] Filed: Jul. 29, 1996

[51] Int. Cl.$^6$ .................................... C08G 75/00

[52] U.S. Cl. .................... 528/373; 528/499; 528/503; 525/88; 525/96; 521/58; 264/45.2; 264/45.7; 264/45.9; 264/219; 264/232

[58] Field of Search ..................... 528/373, 499, 528/503; 525/88, 96; 521/58; 264/45.2, 45.7, 45.9, 219, 232

[56] References Cited

U.S. PATENT DOCUMENTS

| 3,247,133 | 4/1966 | Chen . |
| 4,514,304 | 4/1985 | Miyaki et al. . |
| 4,812,269 | 3/1989 | Harttig et al. . |
| 4,948,508 | 8/1990 | Nakagawa et al. . |
| 5,006,256 | 4/1991 | David . |
| 5,232,601 | 8/1993 | Chu et al. . |

FOREIGN PATENT DOCUMENTS

| 64-9230 | 1/1989 | Japan . |
| 2-2862 | 1/1990 | Japan . |
| 2-160026 | 6/1990 | Japan . |
| 1616-935-A | 1/1989 | U.S.S.R. . |

OTHER PUBLICATIONS

M. Amiji et al., "Prevention of Protein Adsorption and Platelet Adhesion on Surfaces by PEO/PPP/PEO Triblock Copolymers", *Biomaterials* 1994, vol. 15 No. 6., 417–422.

Butuc et al., "Modified Polysulfones. I. Synthesis and Characterization of Polysulfones with Unsaturated With Unsaturated End Groups", *J.M.S.–Pure Appl. Chem.*, A31(2), pp. 219–230 (1994).

Klein et al., "Affinity Membranes Prepared From Hydrophilic Coatings On Microporus Polysulfone Hollow Fibers", *Journal of Membrane Science*, 90 (1994) 69–80.

Lomasney, "A Study of Fabrication and Characterization of PSF Ultrafiltration Membranes With PEO-PSF Block Copolymer Additives", *Abstract of Thesis submitted to the faculty of the Department of Plastics Engineering to the University of Massachusetts Lowell*, 1995.

T. Matsuda et al., "Surface Coating of Hydrophilic–hydrophobic Block Co–polymers On A Poly(acrylonitrile Haemodialyser Reduces Platelet Adhesion and Its Transmembrane Stimulation", *Biomaterials* vol. 15 No. 6 (1994) pp. 417–422.

M.S. Shoichet et al., "Materials Used in Devices for the Treatment of Neurological Disorders", *Polymer Material S.E.*, Fall 1994, vol. 71, p. 16.

*Primary Examiner*—Duc Truong
*Attorney, Agent, or Firm*—Fish & Richardson

[57] ABSTRACT

An amphiphilic block copolymer including a hydrophilic internal segment and polymeric articles made therefrom.

19 Claims, No Drawings

THERMOPLASTIC BLOCK COPOLYMERS

BACKGROUND OF THE INVENTION

Desirable amphiphilic are strong, thermally-stable, and resistant to oxidative or corrosive elements in the material to be separated such as acids or chloride ions. Hydrophobic polymers such as polysulfones often provide the above characteristics. When aqueous or polar materials are to be separated, however, a hydrophilic surface is also desirable. A hydrophilic or wettable surface decreases adsorption of material such as protein and other solutes (i.e., fouling).

In addition to one method which simply blends hydrophobic polymers with a hydrophilic additive or alloy, there are several methods of treating pre-formed polymers to increase surface hydrophilicity. For example, one method relies on hydrophobic bonding between a pre-formed hydrophobic polymer and an adsorptive coating. Much activity has focused on derivatizing functional groups exposed on the surface of a pre-formed polymer with surface modifying ligands. Some methods include direct sulfonation, hydroxyalkylation, or other derivatization of reactive functional groups on a pre-formed polymer membrane.

SUMMARY OF THE INVENTION

One aspect of the invention relates to a hydrophilic-hydrophobic diblock copolymer or a hydrophilic-hydrophobic-hydrophilic triblock copolymer, or a combination thereof.

An example is a block copolymer having the formula (1):

R—[OCH$_2$A]$_n$—X—Y  (1)

wherein R is H, C$_{1-20}$ alkyl, C$_{7-20}$ alkylaryl, C$_{7-20}$ arylalkyl, or C$_{1-20}$ perfluoroalkyl. Each A is independently selected from CH$_2$ and CH(CH$_3$);1 n is between 1 and 10,000. X is —Z$^1$—(OAr$^1$OAr$^2$)$_m$— or —(OAr$^2$Q)$_m$—, Q being OAr$^1$ or [OCH$_2$E]$_u$, wherein m is between 1 and 500, each E is independently selected from CH$_2$ and CH(CH$_3$), and u is between 1 and 10,000. Y is hydroxy, —(OAr$^3$O)—Z$^2$—[BCH$_2$O]$_p$—R$^1$, or —(OAr$^4$O)—[BCH$_2$O]$_p$—R$^1$, wherein each B is independently selected from CH$_2$ and CH(CH$_3$), and p is between 1 and 10,000. Z$^1$ is selected from —N(R$^2$)—(SO$_2$)—C$_6$H$_4$— and —N(R$^2$)—(C=O)—C$_6$H$_4$—, R$^2$ being C$_{1-12}$ alkyl or C$_{6-20}$ aryl. Z$^2$ is selected from —C$_6$H$_4$—(SO$_2$)—N(R$^3$)— and —C$_6$H$_4$—(C=O)—N(R$^3$)—, R$^3$ being C$_{1-12}$ alkyl or C$_{6-20}$ aryl. R$^1$ is H, C$_{1-20}$ alkyl, C$_{7-20}$ alkylaryl, C$_{7-20}$ arylalkyl, or C$_{1-20}$ perfluoroalkyl. Each Ar$^1$ and each Ar$^3$ is independently selected from 1,4-phenylene, 1,3-phenylene, naphthyl-1,4-diyl, naphthyl-1,5-diyl, 4,4'-biphenylene, diphenyl ether-4,4'-diyl, diphenylthioether-4,4'-diyl, diphenylisopropylidene-4,4'-diyl, diphenylhexafluoroisopropylidene-4,4'-diyl, diphenylalkylene-4,4'-diyl wherein alkylene is (CH$_2$)$_q$—, q being 1, 3, 5, 7 or 9, p-terphenyl-4,4'-diyl, and bivalent radicals of binaphthalene, anthracene, and phenylnaphthalene; and each Ar$^2$ and each Ar$^4$ is independently selected from diphenylsulfoxide-4,4'-diyl, diphenylsulfone-4,4'-diyl, diphenyl ketone-4,4'-diyl, and bivalent radicals of diphenyl-C$_{1-12}$ alkyl phosphine oxide and diphenyl-C$_{6-20}$ aryl phosphine oxide.

Another aspect of the invention features a block copolymer, which includes a central block segment selected from polyethylene oxide block and a polyethylene oxide-polypropylene oxide copolymer, wherein the segment is linked between two polyarylsulfone block segments by ether linkages; and a first endgroup and a second endgroup, each endgroup selected independently from polyethylene oxide C$_{1-10}$ alkyl ether and polyethylene glycol mono-C$_{1-10}$ alkyl ether and each linked to an arylsulfone moiety connected to one of said polyaryl sulfone block segments.

Another aspect of the invention relates to a polymer article with a covalently-bonded hydrophilic moiety present on its active surface. The polymer article includes (i) a hydrophilic-hydrophobic block copolymer (such as a hydrophilic-hydrophobic diblock copolymer, or a hydrophilic-hydrophobic-hydrophilic triblock copolymer, or a combination thereof, e.g., formula (1) above, or formula (2), below), and (ii) a hydrophobic polymer. The polymer matrix of the article is formed by the hydrophobic polymer mixing with hydrophobic block segments of a disclosed block copolymer of formula (1). A hydrophilic moiety includes a partial length or portion of a hydrophilic block segment of the block copolymer.

Some important terms used in this disclosure are defined or exemplified below:

The term "alkyl" includes straight-chain groups such as methyl, n-hexyl, nonyl, tetradecyl, and icosyl; branched groups such as isopropyl, isopentyl, neopentyl, tert-pentyl, 4-ethyl-5-methyloctyl, and 4-isopropyl-5-propyl-nonyl; and cyclic alkyl groups such as cyclopropyl, cyclopentyl, and 2-methyl-4-ethylcyclohexyl.

The term "bivalent radical" means a structural moiety with two free valences. The bivalent radical is bonded to two other moieties at the sites of the two valences. When bivalent formulas are provided, the following convention should be noted. For example, in formula (1) R—(OCH$_2$CH$_2$)n—X—Y, X can be —Z$^1$—(OAr$^1$OAr$^2$)$_m$—, wherein Z$^1$ is —N(R$^2$)—(SO$_2$)—C$_6$H$_4$—. The left-terminal atom of X (i.e., the nitrogen atom of Z$^1$) is bonded to the right-terminal carbon atom of R—(OCH$_2$CH$_2$)$_n$—. Similarly, the right-terminal carbon atom of X (carbon of rightmost Ar$^2$) is bonded to the left-terminal atom of Y. Note that Z$^2$ moieties are the same as Z$^1$ moieties except that the orientation of these bivalent moieties has been horizontally reversed or flipped. This relationship is also observed in the use of (oxyethylene) and (ethyleneoxy).

The term "perfluoroalkyl" means fully-fluorinated straight-chain carbon chains, such as trifluoromethyl and pentafluoroethyl. Perfluoroalkyls can be generalized by C$_n$F$_{2n+1}$.

The term "hydrophilic" as in "hydrophilic active surface" means the same as wettable, or capable of forming at least some hydrogen bonds with water by means of polar atoms or groups of atoms. Hydrophilicity can be measured macroscopically by measuring, e.g., water contact angle, permeability, solvent flux, and solute rejection. Even after being dried, a spontaneously wettable surface requires little or no additional surfactant or humectant. Certain polymer articles which include the disclosed block copolymers are spontaneously wettable (see, e.g., Example 3).

The term "weight percent" as used above to describe a casting solution means, for example, the weight of a component (e.g., block copolymer, solvent, matrix polymer, or additive, if any) divided by the total weight of the casting solution and then multiplied by 100.

Throughout this disclosure, all numerical ranges (e.g., ratios, temperatures, weight percents, and integer values of m, n, p, and so on) are understood to be inclusive.

The block copolymers disclosed herein are useful as surface adhesion agents which improve dispersion or adsorption of inorganic and organic additives mixed with polymers; and as interfacial agents which strengthen the mechanical properties at the interface between two mixed or phase separated polymers. The block copolymers disclosed herein are useful for molding, extrusion, and coating applications.

Other features and advantages of the present invention will be apparent from the following detailed description, and also from the appending claims.

DETAILED DESCRIPTION OF THE INVENTION

One aspect of the invention features a block copolymer used to make a porous polymer article having a plurality of active surface block segment moieties on the active surface of the article, wherein the active surface block segments are covalently bound to, and yet have properties different from, the interior anchor block segments of the article. The invention includes the porous polymer article, and a method of making it.

In some embodiments of the block copolymer having formula (1) described in the Summary section, each Q moiety is $OAr^1$.

Another embodiment of the invention is a block copolymer of formula (1), wherein each of R and $R^1$ is H or $C_{1-10}$ alkyl, n is between 40 and 8,000, X is $-[OAr^2Q]_m$, m is between 4 and 250, Y is $-OAr^4O-[BCH_2O]_p-R^1$, and p is between 40 and 8,000, provided that one Q moiety is $[OCH_2E]_u$, u being between 40 and 8,000, and two Q moieties are selected independently from $OAr^1$. This embodiment has the formula (2):

$$R-[OCH_2A]_n-[OAr^2Q]_m-OAr^4O-[BCH_2O]_p-R^1 \quad (2)$$

In various embodiments of formula (2), in one Q 80%–100% of E moieties is $CH_2$, and 80%–100% of A moieties and B moieties combined is $CH_2$; at least two Q moieties are $[OCH_2E]_u$; each of R and $R^1$ is independently H or $C_{1-3}$ alkyl, e.g., independently H or methyl, or independently $C_{1-3}$ alkyl; 80%–100% of $Ar^2$ and $Ar^4$ is diphenylsulfone-4,4'-diyl; or 80%–100% of $Ar^1$ and $Ar^3$ is diphenylisopropylidene-4,4'-diyl; or combinations thereof. In some embodiments of formula (2), R is not H; or Y is not OH; or R is not H and Y is not OH.

In other various embodiments, up to 80 weight percent of the block copolymer is polyethylene oxide homopolymer, or a combination of polyethylene oxide homopolymer and polyethylene oxide-polypropylene oxide copolymer (e.g., up to 20%, between 10% and 80%, between 10% and 60%, between 20% and 50%, or between 40 and 80%). In additional embodiments, up to 80 weight percent of central block segment $-[OAr^2Q]_m$ — includes a polyethylene oxide block polymer or an ethylene oxide-propylene oxide block copolymer; or $-[OAr^2Q]_m$— includes a moiety having a molecular weight between 2,000 Da and 200,000 Da, this moiety being a polyethylene oxide block, an ethylene oxide-propylene oxide block copolymer, or a polyethylene oxide-polypropylene oxide-polyethylene oxide block copolymer. In some embodiments, n, u and p are each independently between 1 and 10,000 (e.g., between 40 and 8,000, 40 (or 100 or 2,000) and 5,000; and m is between 1 and 500 (e.g., between 3 (or 4, 10, 25, or 50) and 500, 50 and 500, 125 and 200, and 100 and 250). In one example, n is between 100 and 5,000, u is between 100 and 5,000, p is between 100 and 5,000, and m is between 125 and 200.

Regarding the number of internal (or central) PEO or PEO/PPO blocks and the run length of $-(OAr^2OAr^1)_m-$ or $-(OAr^2OAr^1)_m-$ (e.g., polysulfone) repeating units, the following general guidelines are provided. For materials prepared with an equivalent weight fraction of PEO, the number of internal PEO blocks will be inversely proportional to the molecular weight of the PEO employed. For example, the number of PEO repeating units in a given block copolymer formed with a 10,000 g/mole PEO-diol is greater than the number of PEO repeating units in a block copolymer formed with a 35,000 g/mole PEO-diol. At the same time, the run length of PSF repeating units will increase as the molecular weight of the PEO-diol increases.

The disclosed block copolymers provide high molecular weight and/or high weight percent of hydrophilic (e.g., PEO or PEO/PPO) segments, particularly internal segments, which increase suitability of the block copolymers for thermoplastic applications. Resulting polymer articles also have an organized structure with portions of active surface segments present across the active surface of the article, as discussed in U.S. Ser. No. 08/508,178.

Any portion or moiety of a block segment may be present on the active surface of an article; surface presentation of the entire segment is not required. Thus, where a block copolymer has a PEO block $-(OCH_2CH_2)_{200}-$, a PEO block segment moiety could be 50%, 35%, or 10%, or more, or less, of the 200-monomer length. It is possible that a relatively long single block segment gives rise to two or more active surface segment moieties which are connected to each other by a portion of the block segment that is not presented at the surface. In certain embodiments the active surface segment moieties are uniformly present across the active surface of the article. The uniformity (i.e., more or less even or average distribution of active surface segments) can be measured by methods such as X-ray photoelectron spectroscopy. In certain embodiments which include PEO, the density of active surface segment moieties (i.e., PEO moieties) is sufficient to impart macroscopically-detectable hydrophilicity to the active surface (e.g., low water contact angle). A plurality of active surface segments (e.g., membrane-integrated or covalently-bonded hydrophilic moieties) means two or more active surface segments to create an active surface with the desired property or properties, such as degree of hydrophilicity. The above descriptive principles encompass block copolymers and membranes, films, or other forms made therefrom, wherein the block copolymer is a diblock (A-b-B), a triblock (e.g., A-b-B-b-A or A-b-B-b-C, where C has a higher affinity for A and the coagulation medium, than for B and the casting solution solvent), a tetrablock, etc., or combinations thereof.

A polymer article containing one or more disclosed block copolymers has improved performance. According to the invention, hydrophilic active surface segments are permanently integrated into the polymer during polymer formation. Therefore, no further functionalization or derivatization is required, which shortens the manufacture time and simplifies the machinery necessary to make the disclosed polymer articles.

Block Copolymers

One aspect of the invention relates to a block copolymer having the formula (1) or (2) as described in the Summary. According to the invention, a block copolymer generally includes two block segments with different properties. For example, in one aspect, an amphiphilic block copolymer has a hydrophilic block segment and a hydrophobic block segment. Hydrophobic and hydrophilic are relative terms well-known to those in the art. Hydrophilic polymers include peptides, dialkylacrylamides, and preferably poly (ethylene oxide) (PEO). The chain-terminating (i.e., endcapping) monofunctional PEO or PPO is commercially available in a variety of molecular weights. PEO or PEG is available in a range between 0.4 kD to 1,000 kD, such as 1.0 kD to 600 kD, or 4 kD to 200 kD.

Block copolymers having lower molecular weight PEO segments generally decrease the glass transition temperature of polysulfones, and are therefore suitable as internal plasticizers. Block copolymers having higher molecular weight PEO segments have a greater tendency to undergo phase separation, and are therefore suitable to prepare thermoplastic elastomers. Certain embodiments include PEO in the higher available molecular weight ranges. Hydrophobic polymers include polyalkylmethacrylates, polyphenylene, and preferably polyacrylonitrile, polyvinyl halides, polyvinylidene halides, polyimide, polyamide, polyetherimide, and even more preferably poly(arylethers) such as homopolymers of —(OAr$^1$OAr$^2$)— (e.g., wherein Ar$^2$ is polyether sulfone or polysulfone). Halides include bromides, iodides, and preferably fluorides and chlorides.

The invention contemplates the use of combinations of diblock and triblock copolymers, and combinations of different block copolymers, e.g., nonylphenyl poly(oxyethylene)-b-poly(aryl ether sulfone)-b-poly(ethyleneoxy)phenylnonyl and perfluoroalkyl poly(oxyethylene)-b-poly(aryl ether sulfone), to make porous polymer articles such as flat sheet or hollow fiber membranes. Examples of pairs of diblock and corresponding triblock copolymers include methyl poly(oxyethylene)-b-poly(aryl ether sulfone) and methyl poly(oxyethylene)-b-poly(aryl ether sulfone)-b-poly(ethyleneoxy)methyl; phenyl poly(oxyethylene)-b-poly(aryl ether sulfone) and phenyl poly(oxyethylene)-b-poly(aryl ether sulfone)-b-poly(ethyleneoxy)phenyl; stearyl poly(oxyethylene)-b-poly(aryl ether sulfone) and stearyl poly(oxyethylene)-b-poly(aryl ether sulfone)-b-poly(ethyleneoxy)stearyl; cetyl poly(oxyethylene)-b-poly(aryl ether sulfone) and cetyl poly(oxyethylene)-b-poly(aryl ether sulfone)-b-poly(ethyleneoxy)cetyl; lauryl poly(oxyethylene)-b-poly(aryl ether sulfone) and lauryl poly(oxyethylene)-b-poly(aryl ether sulfone)-b-poly(ethyleneoxy)lauryl; octylphenyl poly(oxyethylene)-b-poly(aryl ether sulfone) and octylphenyl poly(oxyethylene)-b-poly(aryl ether sulfone)-b-poly(ethyleneoxy)phenyloctyl; nonylphenyl poly(oxyethylene)-b-poly(aryl ether sulfone) and nonylphenyl poly(oxyethylene)-b-poly(aryl ether sulfone)-b-poly(ethyleneoxy)phenylnonyl; and perfluoroalkyl poly(oxyethylene)-b-poly(aryl ether sulfone) and perfluoroalkyl poly(oxyethylene)-b-poly(aryl ether sulfone)-b-poly(ethyleneoxy)perfluoroalkyl.

Note that in formula (1), X can be —(OAr$^2$OAr$^1$)$_m$—. In other words, there are m —(OAr$^2$OAr$^1$)— units. An alternative expression for this block is —(OAr$^2{}_i$OAr$^1{}_i$)$_i$—, where i is 1 to m. Similar expressions exist for the other block segments, such as those involving n and p. The methods of making a block copolymer permit wide variation, such that Ar$^1$ and Ar$^2$ in one —(OAr$^2$OAr$^1$)— unit may differ from the Ar$^1$ and Ar$^2$ in another (e.g., adjacent) —(OAr$^2$OAr$^1$)— unit. In other words, each of Ar$^1{}_1$ and Ar$^1{}_2$ is independently selected. The term "each of Ar$^1$ and Ar$^3$ is independently selected from" is therefore understood to encompass such "mixed" blocks. However, it is preferred that 90% of the m units are the same.

The wt % of a hydrophilic internal or terminal segment can also be increased by decreasing, or even omitting, bisphenol A and linking the bifunctional segments by bischlorophenyl sulfone directly.

In one aspect of the invention, one or more internal segments of the block copolymer is PEO or PEO/PPO random copolymers. Such internal segments are generally formed with the corresponding difunctional PEG, which is commercially available in a wide variety of intermediate and high molecular weights (kD) such as 1, 2, 4, 8, 10, 12, 18.5, 35, 50, 80, and 100. Random difunctional PEO/propylene oxide copolymers, and diblock and triblock copolymers are commercially available in many molecular weights between 1,000 and 1,000,000 Da. Copolymers and block copolymers are preferably between 2,000 and 20,000 Da. Combinations of the above include: two or more different molecular weight PEGs (Example 1); PEO/PPO random copolymer (Example 2); and the same or different molecular weight PEGs (internal bifunctional) and PEOs (chain terminating) (see Examples 3 and 4). Proportions of these combinations can be equal or unequal.

In one embodiment, the total weight percent of polyethylene oxide block and polyethylene oxide-polypropylene oxide random copolymer is up to 80 weight percent (e.g., between 10 and 60 weight percent of the block copolymer, or between 10 and 40% weight percent). For a given total weight percent of PEO block and PEO/PPO random copolymer, such as 40 weight percent, a variety of combinations of PEO block and PEO/PPO random copolymer are possible. For example, contributions of PEO block and PEO/PPO random copolymer, respectively, include: 0% and 40%, 10% and 30%, 40% and 0%, 25% and 15%, 20% and 20%, and so on. Analogously, other pairs or multi-component combinations from among PEO block, PPO block, PEO/PPO random copolymer, and PEO-PPO-PEO triblock, can constitute up to 80 weight percent of a disclosed block copolymer.

Internal segments of PEO increase the overall weight percent of PEO, and in conjunction with chain-terminating PEO groups, produce a block copolymer having more uniform properties which are suitable for thermoplastic applications, such film formation, melt-extrusion, and molding. Sampled block copolymers of formula (3) had melting points of 150° C.–170° C. and degraded at temperatures around 300° C. Based on melting point, DSC, and glass transition measurements, the processing windows for block copolymers of formula (3) are appropriate for a range of applications, especially as interfacial adhesion agents, and as dispersion, or adsorption agents which improve mechanical strength.

Block copolymers of formula (3) are particularly suitable for making thermoplastic polymeric articles. The method of making these articles includes (a) blending and/or co-melting a block copolymer of formula (3) with a compatible (e.g., high-melting) thermoplastic such as polysulfones, polyaryl ethers, polycarbonates, and nylons; or (b) co-mixing a block copolymer of formula (3) with an incompatible polymer or with an organic additive or inorganic such as titania or silica. The blended, co-melted, or co-mixed material is then injection molded, extruded, or thermo-formed under pressure, and cooled to a rigid or semi-rigid state.

Higher weight percents of PEO generally increase the thermoplastic elastic properties of the product. Polymers having 30 wt % (Example 3), 50 wt % (Example 4), and 80 wt % (not shown) have been made. Thermoplastic elastic properties can be easily measured by methods known to those in the art, such as melting point, DSC, and glass transition temperatures.

Synthesis of a Block Copolymer

The invention is based, in part, on the design of a block copolymer consistent with the principles described above. After discovery of these principles, synthesis of a specific block copolymer is straightforward, and is accomplished by numerous routes known or easily determined by those in the art. Examples are provided below.

Extruded, Molded, or Coated Articles

Another aspect of the invention is a thermoplastic (e.g., extruded, molded, or moldable) polymer article which has been molded, extruded, or otherwise formed from a composition which includes (i) one or more block copolymers of formula (1) or (3), and (ii) an inorganic additive such as titania or silica; a thermoplastic polymer, such as a polyaryl ether, a polycarbonate, or a nylon; or other organic additives; or a combination thereof. In general, the thermoplastic article has at least one surface capable of phase-separation, surface adhesion, or interfacial interaction as a result of the block copolymer of formula (1) or (2). The invention therefore features a polymeric article formed by either the direct extrusion or the injection molding of a composition containing a block copolymer of formula (2), e.g., wherein the composition further contains an inorganic additive, or wherein said composition further contains a thermoplastic polymer, or a combination thereof.

Thermoplastic films and molded forms can be formed with block copolymers having generally higher molecular weight percents of PEO relative to the cast polymers. Solvents include polar aprotic solvents and other appropriate solvents known to those in the art, such as DMSO, DMF, THF, MEK, halocarbons (e.g., freon or chloroform), and NMP. The PEO segment(s) of the disclosed block copolymers provide increased hydrophilicity and lubricity, and therefore the disclosed block copolymers can act as internal mold release agents. Hydrophilicity is desirable for biocompatibility or hemocompatibility, including improved lubricity for manufacturing, demonstrated by ease of release of an injection molded article from the mold. Lubricity or hydrophilicity are desirable for biomedical devices, particularly invasive or insertable devices such as urogenital and ocular devices, such as contact lenses, catheters, and other prosthetic devices. In addition, hydrophilic packaging films are more resistant to fogging. Hydrophilicity is demonstrated by, for example, water contact angle measurements.

Without further elaboration, it is believed that the present invention can be utilized to its fullest extent. The following examples, therefore, are to be construed as illustrative, and not limitative, of the remainder of the disclosure.

EXAMPLE 1

A 1-L round bottom flask equipped with a mechanical stirrer, a Dean-Stark trap, and a nitrogen purge was charged with 309.1 grams dipotassium carbonate and the following monomers: 32.3 grams 5,000 Da monomethyl polyethylene glycol; 290.3 grams 10,000 Da polyethylene glycol; 162.8 grams bisphenol A; and 214.1 grams 4,4'-chlorophenylsulfone. Under nitrogen flow, 600 ml toluene and 1500 ml N-methylpyrrolidone solvents were added. The flask was sealed with a rubber septa through which a thermocouple probe was inserted. Heating the reagent mixture with stirring to toluene reflux initiated the reaction, at about 155°–160° C. Water-toluene azeotrope collected in the Dean-Stark trap, yielding a total of 26.0 mL water during 5 hours. Toluene was distilled from the system as the temperature was raised to 190° C. to affect polymerization. After 6 hours, polymerization was halted, and the mixture allowed to cool to room temperature. Mixing with an excess of dilute HCl neutralized the residual potassium carbonate and precipitated a viscous polymer. After two extractions with fresh water, the recovered polymer was filtered and dried in a convection oven at 65° C. to a constant weight.

Four additional block polymers were prepared as Example 9, substituting for polyethylene glycol of average molecular weight 10,000 Da, polyethylene glycols of 4000 Da, 8000 Da, 12000 Da, and 18500 Da, respectively.

EXAMPLE 2

A polymer was prepared as in Example 1, with the following stoichiometry. A weight fraction of 40% of a random two-component PEO/PPO (5:1 ratio, MW 8750, Polyscience, Warrington, Pa.) was used. The two-component PEO/PPO (0.006 mole) was reacted with 0.2754 mole bisphenol A, 0.2784 moles of bischlorophenylsulfone, and 0.8352 moles of potassium carbonate in 375 ml of NMP and 125 ml toluene.

EXAMPLE 3

A polymer was prepared as in Example 1, with the following stoichiometry. A weight fraction of 30% of a 1:2 ratio of a two-component polyethylene glycol consisting of 0.0174 mole 10 kD PEG (Fluka Chemika, Switzerland) and $3.87 \times 10^{-3}$ mole 5 kD polyethylene glycol monomethyl ether (Polyscience, Warrington, Pa.) was used. The two-component PEG (0.0387 mole) was reacted with 1.01 mole bisphenol A, 1.03 moles of bischlorophenylsulfone, and 3.09 moles of potassium carbonate in 1.5 liters of NMP and 600 ml toluene.

EXAMPLE 4

A polymer was prepared as in Example 1, with the following stoichiometry. A weight fraction of 50% of a two-component polyethylene glycol consisting of 0.0290 mole 10 kD PEG (Fluka Chemika) and $6.45 \times 10^{-3}$ mole 5000 kD polyethylene glycol monomethyl ether (Polyscience) was used. The two-component PEG (0.0645 mole) was reacted with 0.713 mole bisphenol A, 0.745 moles of bischlorophenylsulfone, and 2.24 moles of potassium carbonate in 1.5 liters of NMP and 600 ml toluene.

OTHER EMBODIMENTS

From the above description, the essential characteristics of the present invention can be ascertained. Without departing from the spirit and scope thereof, various changes and modifications can be made to adapt to various usages and conditions.

For example, a tetrablock or pentablock copolymer including poly(ethyleneoxy) and a hydrophobic block segment such as but not limited to those described herein is also within the scope of the claims. Similarly, by adjusting the solvents and additives, a non-porous dense film may be made with the recited block copolymers. In addition, poly (ethyleneoxy) may be replaced by a similarly hydrophilic polymer. Thus, other embodiments are also within the claims.

What is claimed is:

1. A block copolymer having the formula:

wherein R is H, $C_{1-20}$ alkyl, $C_{7-20}$ alkylaryl, $C_{7-20}$ arylalkyl, or $C_{1-20}$ perfluoroalkyl;

each A is independently selected from $CH_2$ and $CH(CH_3)$;

n is between 1 and 10,000;

X is $-Z^1-(OAr^1OAr^2)_m-$ or $-(OAr^2Q)_m-$, Q being $OAr^1$ or $[OCH_2E]_u$, wherein m is between 1 and 500, each E is independently selected from $CH_2$— and $CH(CH_3)$—, and u is between 1 and 10,000; and Y is hydroxy, —$(OAr^3O)$—$Z^2$—$|BCH_2O|_p$—$R^1$, or —$(OAr^4O)$—$|BCH_2O|_p$—$R^1$, wherein each B is independently selected from $CH_2$ and $CH(CH_3)$, and p is between 1 and 10,000;

wherein $Z^1$ is selected from —$N(R^2)$—$(SO_2)$—$C_6H_4$— and —$N(R^2)$—$(C=O)$—$C_6H_4$—, $R^2$ being $C_{1-12}$ alkyl or $C_{6-20}$ aryl;

$Z^2$ is selected from —$C_6H_4$—$(SO_2)$—$N(R^3)$— and —$C_6H_4$—$(C=O)$—$N(R^3)$—, $R^3$ being $C_{1-12}$ alkyl or $C_{6-20}$ aryl;

$R^1$ is H, $C_{1-20}$ alkyl, $C_{7-20}$ alkylaryl, $C_{7-20}$ arylalkyl, or $C_{1-20}$ perfluoroalkyl;

each $Ar^1$ and each $Ar^3$ is independently selected from 1,4-phenylene, 1,3-phenylene, naphthyl-1,4-diyl, naphthyl-1,5-diyl, 4,4'-biphenylene, diphenyl ether-4,4'-diyl, diphenylthioether-4,4'-diyl, diphenylisopropylidene-4,4'-diyl, diphenylhexafluoroisopropylidene-4,4'-diyl, diphenylalkylene-4,4'-diyl wherein alkylene is —$(CH_2)_q$—, q being 1, 3, 5, 7 or 9, p-terphenyl-4,4'-diyl, and bivalent radicals of binaphthalene, anthracene, and phenylnaphthalene; and each $Ar^2$ and each $Ar^4$ is independently selected from diphenylsulfoxide-4,4'-diyl, diphenylsulfone-4,4'-diyl, diphenyl ketone-4,4'-diyl, and bivalent radicals of diphenyl-$C_{1-12}$ alkyl phosphine oxide and diphenyl-$C_{6-20}$ aryl phosphine oxide.

2. A block copolymer of claim 1, wherein each of R and $R^1$ is H or $C_{1-10}$ alkyl, n is between 40 and 8,000, X is —$[OAr^2Q]_m$, m is between 4 and 250, Y is —$OAr^4O$—$[BCH_2O]_p$—$R^1$, and p is between 40 and 8,000, provided that at least one Q moiety is $[OCH_2E]_u$, u being between 40 and 8,000, and two Q moieties are selected independently from $OAr^1$.

3. A block copolymer of claim 2, wherein in one Q, 80%–100% of E moieties is $CH_2$; and wherein 80%–100% of combined A moieties and B moieties is $CH_2$.

4. A block copolymer of claim 2, wherein at least two Q moieties are $[OCH_2E]_u$.

5. A block copolymer of claim 2, wherein each of R and $R^1$ is independently H or $C_{1-3}$ alkyl.

6. A block copolymer of claim 5, wherein each of R and $R^1$ is independently H or methyl.

7. A block copolymer of claim 2, wherein at least 80% of $Ar^2$ and $Ar^4$ is diphenylsulfone-4,4'-diyl.

8. A block copolymer of claim 2, wherein at least 80% of $Ar^1$ and $Ar^3$ is diphenylisopropylidene-4,4'-diyl.

9. A block copolymer of claim 2, wherein —$|OAr^2Q|_m$— includes a polyethylene oxide block or an ethyle oxide-propylene oxide block copolymer.

10. A block copolymer of claim 9, wherein —$|OAr^2Q|_m$— includes a moiety having a molecular weight between 2,000 daltons and 200,000 daltons, said moiety being a polyethylene oxide block, a polypropylene oxide block, a random ethylene oxide-propylene oxide block copolymer, or a polyethylene oxide-polypropylene oxide-polyethylene oxide triblock copolymer.

11. A block copolymer of claim 2, wherein the total weight percent of polyethylene oxide block and polyethylene oxide-polypropylene oxide random copolymer is up to 80 weight percent of the block copolymer.

12. A block copolymer of claim 11, wherein said total weight percent of polyethylene oxide block and polyethylene oxide-polypropylene oxide random copolymer is between 10 and 60 weight percent of the block copolymer.

13. A block copolymer of claim 1, wherein n is between 40 and 8,000, u is between 40 and 8,000, p is between 40 and 8,000, and m is between 50 and 400.

14. A block copolymer of claim 13, wherein n is between 100 and 5,000, u is between 100 and 5,000, p is between 100 and 5,000, and m is between 125 and 200.

15. A block copolymer of claim 1, wherein R and $R^1$ are each independently $C_{1-3}$ alkyl.

16. A block copolymer, comprising a central block segment selected from polyethylene oxide block and a polyethylene oxide-polypropylene oxide copolymer, said segment being linked between two polyarylsulfone block segments by ether linkages; and a first endgroup and a second endgroup, each endgroup selected independently from polyethylene oxide $C_{1-10}$ alkyl ether and polyethylene glycol mono-$C_{1-10}$ alkyl ether and each linked to an arylsulfone moiety connected to one of said polyaryl sulfone block segments.

17. A polymeric article formed by either the direct extrusion or the injection molding of a composition containing a block copolymer of claim 1.

18. A polymeric article of claim 17, wherein said composition further contains an inorganic additive.

19. A polymeric article of claim 17, wherein said composition further contains a thermoplastic polymer.

* * * * *